United States Patent
Kono et al.

(10) Patent No.: US 11,518,872 B2
(45) Date of Patent: Dec. 6, 2022

(54) CHLORINATED POLYOLEFIN RESIN COMPOSITION

(71) Applicant: NIPPON PAPER INDUSTRIES CO., LTD., Kita-ku (JP)

(72) Inventors: Masaru Kono, Kita-ku (JP); Kensuke Asai, Kita-ku (JP); Takao Yoshimoto, Kita-ku (JP); Takato Takenaka, Kita-ku (JP); Minoru Yada, Kita-ku (JP); Naosuke Komoto, Kita-ku (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 167 days.

(21) Appl. No.: 16/493,794

(22) PCT Filed: Mar. 12, 2018

(86) PCT No.: PCT/JP2018/009463
§ 371 (c)(1),
(2) Date: Sep. 13, 2019

(87) PCT Pub. No.: WO2018/168753
PCT Pub. Date: Sep. 20, 2018

(65) Prior Publication Data
US 2020/0385557 A1 Dec. 10, 2020

(30) Foreign Application Priority Data

Mar. 17, 2017 (JP) .............................. JP2017-052179

(51) Int. Cl.
| | |
|---|---|
| *C08L 23/14* | (2006.01) |
| *C08L 23/28* | (2006.01) |
| *C08L 53/00* | (2006.01) |
| *C08L 51/06* | (2006.01) |
| *C09D 11/106* | (2014.01) |
| *C09D 123/28* | (2006.01) |
| *C09J 123/28* | (2006.01) |
| *C08F 8/20* | (2006.01) |
| *C08F 8/46* | (2006.01) |
| *C08L 23/08* | (2006.01) |

(52) U.S. Cl.
CPC ................ *C08L 23/28* (2013.01); *C08F 8/20* (2013.01); *C08F 8/46* (2013.01); *C08L 23/08* (2013.01); *C08L 23/14* (2013.01); *C08L 51/06* (2013.01); *C08L 53/005* (2013.01); *C09D 11/106* (2013.01); *C09D 123/28* (2013.01); *C09J 123/28* (2013.01); *C08F 2800/20* (2013.01); *C08L 2205/02* (2013.01)

(58) Field of Classification Search
CPC .......... C08L 23/08; C08L 23/14; C08L 23/28; C08L 51/06; C08L 53/005; C08L 2205/025; C08F 8/20
See application file for complete search history.

(56) References Cited

U.S. PATENT DOCUMENTS

| | | | |
|---|---|---|---|
| 5,539,043 | A | 7/1996 | Kimura et al. |
| 2009/0246547 | A1 | 10/2009 | Ishikura et al. |
| 2010/0227970 | A1* | 9/2010 | Nishioka ................ C09J 123/28 524/570 |

FOREIGN PATENT DOCUMENTS

| | | |
|---|---|---|
| CN | 1457351 A | 11/2003 |
| CN | 101384676 A | 3/2009 |
| CN | 104185650 A | 12/2014 |
| JP | 7-102134 A | 4/1995 |
| JP | 2001-226545 A | 8/2001 |
| JP | 2007-91933 A | 4/2007 |
| JP | 2012-149199 A | 8/2012 |
| JP | 2012-213692 A | 11/2012 |
| WO | WO 2007/094510 A1 | 8/2007 |

OTHER PUBLICATIONS

Chaudhry, A.U. et al. Polymer Engineering and Science vol. 54(1) pp. 85-95 (Year: 2013).*
International Search Report dated May 15, 2018 in PCT/JP2018/009463 filed on Mar. 12, 2018.
Combined Chinese Office Action and Search Report dated Aug. 17, 2021 in Chinese Patent Application No. 201880018435.5 (with unedited computer generated English translation), 17 pages.

* cited by examiner

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

An object is to provide a chlorinated polyolefin resin composition being superior in adhesion, solution stability, and chipping resistance. The chlorinated polyolefin resin composition contains a component (A): a polyolefin resin A having a melting point ($Tm_A$) obtained with a differential scanning calorimeter (DSC) in the range of 90 to 160° C., and a component (B): a polyolefin resin B having a melting point ($Tm_B$) obtained with a differential scanning calorimeter (DSC) in the range of 50 to 130° C., at least any one of the component (A) and the component (B), or a copolymer thereof being a chlorinated polyolefin resin (where $|Tm_A - Tm_B| \geq 5°$ C.).

17 Claims, No Drawings

CHLORINATED POLYOLEFIN RESIN COMPOSITION

TECHNICAL FIELD

The present invention relates to a chlorinated polyolefin resin composition.

BACKGROUND ART

Polyolefin base materials such as polypropylene have excellent properties and are inexpensive, and therefore are widely used in plastic molded parts, films for food packaging materials, and the like. In such uses, the surface of the polyolefin base material is printed or coated with the purposes of surface protection and improved appearance.

However, since a polyolefin base material is a non-polar base material, has low surface free energy, and has crystallinity, there is a problem that inks and coatings do not easily adhere. Therefore, when carrying out a process such as printing or coating, a technique is widely used in which a chlorinated polyolefin resin is added to the ink or the coating to improve the adhesion to the polyolefin base material.

Plastic molded products made of such a polyolefin base material are often used as members in automotive outer panels, household electric appliances and the like. In order to improve the adhesion of the top coating film and the molded part, a primer containing a chlorinated polyolefin resin and the like is applied in advance.

In recent years, a method for coating automotive outer panels has been proposed in which the plastic molded part is integrated with the automotive outer panel and then coating thereof is carried out (see, for example, Patent Document 1). Such a coating method makes it possible to consolidate the coating line and therefore can be expected to reduce costs and the amount of coating to be used.

PRIOR ART DOCUMENTS

Patent Documents

Patent Document 1: JP-A-2012-213692

SUMMARY OF INVENTION

Problem to be Solved by the Invention

However, in the method described in Patent Document 1, the primer coating is carried out not only to the plastic molded part but also to the automotive outer panel which is metal. Therefore, when the automotive outer panel is adjusted to a certain coating film thickness, the top layer is reduced by the thickness of the primer layer. As a result, there is a problem that the chipping (coating film peeling due to skipping rocks) property of the primer layer is inferior to reduce the chipping resistance of the whole coated parts.

An object of the present invention is to provide a chlorinated polyolefin resin composition being superior in adhesion, solution stability, and chipping resistance.

Means for Solving Problem

The present inventors have made intensive studies with a view to solving the above problem. As a result, the present inventors have confirmed that the above problem can be solved by chlorinating the two polyolefin resins having different melting points (provided that the absolute value of the difference between the melting points is 5° C. or more), and thus the present invention can be completed.

That is, the present inventors provide the following [1] to [11]:

[1] A chlorinated polyolefin resin composition comprising: a component (A): a polyolefin resin A having a melting point ($Tm_A$) obtained with a differential scanning calorimeter (DSC) in the range of 90 to 160° C., and a component (B): a polyolefin resin B having a melting point ($Tm_B$) obtained with a differential scanning calorimeter (DSC) in the range of 50 to 130° C., wherein at least any one of the component (A) and the component (B), or a copolymer thereof is a chlorinated polyolefin resin (where $|Tm_A - Tm_B| \geq 5°$ C.)

[2] The chlorinated polyolefin resin composition according to [1], wherein at least any one of the component (A) and the component (B), or the copolymer thereof is a graft-modified product of an α,β-unsaturated carboxylic acid or an anhydride thereof.

[3] The chlorinated polyolefin resin composition according to [1] or [2], wherein a content ratio of the component (A) and the component (B) (component (A)/component (B)) is in the range of 90/10 to 10/90 (where component (A)+ component (B)=100).

[4] The chlorinated polyolefin resin composition according to any one of [1] to [3], wherein the component (B) is a propylene block copolymer containing a propylene component and another α-olefin component, and the propylene block copolymer contains 60 mass % or more of propylene-derived constituent units.

[5] The chlorinated polyolefin resin composition according to any one of [1] to [4], wherein the copolymer of the component (A) and the component (B) is a chlorinated polyolefin resin.

[6] The chlorinated polyolefin resin composition according to any one of [1] to [5], wherein a chlorine content is 10 to 40 mass %.

[7] The chlorinated polyolefin resin composition according to any one of [1] to [6], wherein a weight-average molecular weight is 10,000 to 200,000.

[8] A primer comprising the chlorinated polyolefin resin composition according to any one of [1] to [7].

[9] An adhesive comprising the chlorinated polyolefin resin composition according to any one of [1] to [7].

[10] A binder for coating comprising the chlorinated polyolefin resin composition according to any one of [1] to [7].

[11] An binder for ink comprising the chlorinated polyolefin resin composition according to any one of [1] to [7].

Effect of the Invention

The present invention provides a chlorinated polyolefin resin composition being superior in adhesion, solution stability and chipping resistance.

EMBODIMENTS FOR CARRYING OUT THE INVENTION

The present invention is described below in detail on the basis of preferred embodiments.

[1. Chlorinated Polyolefin Resin Composition]

The chlorinated polyolefin resin composition of the present invention contains a component (A): a polyolefin resin A having a melting point (hereinafter also referred to as "$Tm_A$") obtained with a differential scanning calorimeter (hereinafter also referred to as a "DSC") in the range of 90 to 160° C., and a component (B): a polyolefin resin B having a melting point (hereinafter referred to as "$Tm_B$") obtained with a DSC in the range of 50 to 130° C., wherein at least any one of the component (A) and the component (B), or a copolymer thereof is a chlorinated polyolefin resin (where $|Tm_A-Tm_B|\geq 5°$ C.).

The chlorinated polyolefin resin composition of the present invention contains at least two resins, the component (A) and the component (B), which have different melting points. Such a chlorinated polyolefin resin composition can form a resin coating film having a suitable elasticity while maintaining good adhesion, and has excellent compatibility with other components because the crystallinity of the composition is not uniform state. Accordingly, the chlorinated polyolefin resin composition is superior in adhesion, solution stability, and chipping resistance.

The absolute value of the difference between the melting points of the component (A) and the component (B) ($|Tm_A-Tm_B|$) is 5° C. or more, preferably at 10° C. or more, and more preferably 15° C. or more. The upper limit thereof is usually 100° C. or less, and preferably 90° C. or less.

When the absolute value of the difference of the melting points of the component (A) and the component (B) satisfies such a condition, the chlorinated polyolefin resin composition containing them is superior in elasticity and compatibility with other components because the crystallinity thereof is not uniform state. Accordingly, the chlorinated polyolefin resin composition is superior in adhesion, solution stability, and chipping resistance.

[1-1. Component (A): Polyolefin Resin A]

The component (A) is the polyolefin resin A having the $Tm_A$ in the range of 90 to 160° C.

The $Tm_A$ of the component (A) is 90 to 160° C., preferably 95 to 150° C., and more preferably 100 to 145° C. When the melting point $Tm_A$ of the component (A) is 90° C. or more, adequate adhesion strength can be obtained. On the other hand, when the melting point $Tm_A$ is 160° C. or less, the adhesion at low temperatures and the solution solubility are good, and adequate storage stability can be obtained at low temperatures.

The Tm measurement with a DSC can be carried out with, for example, the following conditions. In accordance with JIS K7121-1987, a DSC measuring device (manufactured by Seiko Instruments & Electronics) is used to hold a sample of approximately 5 mg at 200° C. for 10 minutes in a heated molten state and then lower the temperature at a rate of 10° C./min for stable holding at −50° C. Then, the temperature is raised again up to 200° C. at a rate of 10° C./min, the melting peak temperature at the time of melting is measured, and that temperature can be used as the $Tm_A$.

As long as the component (A) satisfies the melting point ranges described above, the constituent of the copolymer thereof is not particularly limited. However, the copolymer is preferably at least one type of copolymer selected from the group consisting of polypropylene, an ethylene-propylene copolymer, a propylene-1-butene copolymer, and an ethylene-propylene-1-butene copolymer.

When the component (A) is a copolymer, it may be a random copolymer or a block copolymer.

The ratio of the propylene-derived constituent units contained in the copolymer is preferably 60 mass % or more, and more preferably 60 to 99 mass % of the whole copolymer. Incidentally, the ratios of the constituent components of the component (A) such as propylene-derived constituent units can be calculated from the charged amount of each monomer when preparing the copolymer.

The melt flow rate (MFR) of the component (A) measured at a measurement temperature of 230° C. with a measuring load of 2.16 kg is preferably 0.5 g/10 min or more to less than 5.0 g/10 min, more preferably 1.0 g/10 min or more to less than 5.0 g/10 min, and further preferably 1.0 g/10 min or more to less than 4.0 g/10 min. When the numerical value is less than these ranges, the solution stability may deteriorate. On the other hand, when it is these ranges or more, the cohesive force is too low and the adhesion to a non-polar resin base material may deteriorate.

The measurement of the melt flow rate can be calculated with a Melt Flow Index Tester (manufactured by YASUDA SEIKI SEISAKUSHO) in accordance with ASTM D1238.

[1-2. Component (B): Polyolefin Resin B]

The component (B) is the polyolefin resin B having the $Tm_B$ in the range of 50 to 130° C.

The $Tm_B$ of the component (B) is 50 to 130° C., preferably 55 to 125° C., and more preferably 55 to 120° C. When the melting point $Tm_B$ of the component (B) is 50° C. or more, adequate adhesion strength can be obtained. On the other hand, when the melting point $Tm_B$ is 130° C. or less, the solution stability at low temperatures is good, and adequate storage stability can be obtained at low temperatures.

The measurement of the Tm of the component (B) with a DSC can be carried out in the same manner as the measurement of the Tm of the component (A).

As long as the component (B) satisfies the melting point described above, the constituent of the copolymer thereof is not particularly limited. Examples thereof is a propylene copolymer containing a propylene component and the other α-olefin component and, more specifically, at least one type of copolymer selected from the group consisting of an ethylene-propylene copolymer, a propylene-1-butene copolymer, and an ethylene-propylene-1-butene copolymer.

The copolymer of the component (B) may be a random copolymer or a block copolymer.

Among these, the component (B) is preferably a propylene block copolymer containing a propylene component and the other α-olefin component, and is more preferably a block copolymer consisting of propylene and ethylene.

The term block copolymer refers to the one comprising, as the constituent unit, the block body in which each of α-olefin component such as a propylene component, an ethylene component, or a butene component are continuously copolymerized at a fixed length in the same species. The term random copolymer refers to a copolymer in which the arrangement of the monomer components has no regularity.

The ratio of the propylene-derived constituent units in the copolymer is preferably 60 mass % or more, more preferably 70 mass % or more, and further preferably 80 mass % or more of the whole copolymer. As the upper limit, 100 mass % or less is preferable and 97 mass % or less is more preferable.

Incidentally, the ratios of the constituent components of the component (B) such as propylene-derived constituent units can be calculated from the charged amount of each monomer when preparing the copolymer.

The melt flow rate (MFR) of the component (B) measured at a measurement temperature of 230° C. and with a measuring load of 2.16 kg is preferably 5 to 40 g/10 min, more preferably 7 to 30 g/10 min, and further preferably 7 to 20 g/10 min. When the numerical value is less than these ranges, the solution stability may deteriorate. On the other hand, when it exceeds these ranges, the cohesive force is too low and the adhesion to a non-polar resin base material may drop.

The measurement of the melt flow rate can be calculated with a Melt Flow Index Tester (manufactured by YASUDA SEIKI SEISAKUSHO) in accordance with ASTM D1238.

[1-3. Content Embodiments]

The chlorinated polyolefin resin composition of the present invention contains at least any one of the component (A) and the component (B) or, as a copolymer thereof, a chlorinated polyolefin resin. Examples of the content embodiments include the chlorinated polyolefin resin of the copolymer of the component (A) and the component (B), and a chlorinated polyolefin resin as a mixture obtained by mixing the component (A) and the component (B), and the content embodiment may be selected, as appropriate, according to need. Among these, the embodiment of the chlorinated polyolefin resin of the copolymer of the component (A) and the component (B) is preferable.

The content ratio of the component (A) and the component (B) (component (A)/component (B)) in the chlorinated polyolefin resin composition of the present invention is preferably in the range of 90/10 to 10/90, more preferably in the range of 85/15 to 15/85, and further preferably in the range of 80/20 to 20/80 (where component (A)+component (B)=100).

The content ratio of the component (A) and the component (B) can be calculated with the charged amounts of the component (A) and the component (B) when manufacturing the chlorinated polyolefin resin composition.

[1-4. Chlorination]

The chlorinated polyolefin resin composition of the present invention is at least any one of the component (A) and the component (B), or a copolymer thereof after chlorination. Thereby, it is possible to improve the adhesion of the polyolefin resin to a non-polar resin base material and the compatibility with other components.

An example of the chlorination method includes dissolving the polyolefin resin in chlorinated solvent such as chloroform, and then injecting the chlorine gas therein to introduce chlorine atoms into the polyolefin resin.

Incidentally, the polyolefin resin used in chlorination may be only the polyolefin resin A (i.e., the component (A)), only the polyolefin resin B (i.e., the component (B)), a mixture of the polyolefin resin A and the polyolefin resin B, or a copolymer of the polyolefin resin A and the polyolefin resin B.

The injection of chlorine gas can be carried out under irradiation of ultraviolet rays in the presence or absence of a radical reaction initiator. The pressure used when injecting the chlorine gas therein is not limited, and may be normal pressure or pressurized. The temperature used when injecting the chlorine gas therein is not particularly limited, and is usually 50 to 140° C.

An organic peroxide compound or an azonitrile may be used as the radical reaction initiator. The organic peroxide compound is described in detail below.

The chlorinated polyolefin resin composition of the present invention can be obtained by introducing chlorine into the polyolefin resin. The chlorinated solvent in the system is usually removed by decompression or the like or substituted with an organic solvent.

The chlorine content of the chlorinated polyolefin resin composition of the present invention is preferably 10 to 40 mass %, and more preferably 15 to 30 mass %. When the chlorine content is set to these ranges, it is possible to adjust the polarity of the chlorinated polyolefin resin composition to a certain ranges. As a result, the compatibility with other resins in the coating becomes good to obtain adequate adhesion to non-polar base materials such as a polyolefin base material.

The chlorine content of the chlorinated polyolefin resin composition can be measured on the basis of JIS-K7229.

[1-5. Graft Modification]

The chlorinated polyolefin resin composition of the present invention is preferably a graft-modified product in which at least any one of the component (A) and the component (B) or a copolymer thereof is graft-modified with an α,β-unsaturated carboxylic acid or a derivative thereof (hereinafter also referred to as the "component (C)"). By graft-modifying with the component (C), it is possible to improve the adhesion, the solution stability, the chipping resistance, or the gasohol resistance of the chlorinated polyolefin resin composition.

Examples of the α,β-unsaturated carboxylic acid and derivatives thereof include maleic acid, maleic anhydride, fumaric acid, citraconic acid, citraconic anhydride, mesaconic acid, itaconic acid, itaconic anhydride, aconitic acid, aconitic anhydride, and (meth)acrylic acid. Among these, maleic anhydride, aconitic anhydride, and itaconic anhydride are preferable, and maleic anhydride is more preferable.

The component (C) may be at least any one compound selected from an α,β-unsaturated carboxylic acid and a derivative thereof, a combination of one or more α,β-unsaturated carboxylic acid and one or more derivative thereof, a combination of two or more α,β-unsaturated carboxylic acids, or a combination of two or more derivatives of an α,β-unsaturated carboxylic acid.

The graft-modification can be carried out by causing a radical reaction between the polyolefin resin and the component (C) in the presence of a radical generator. Incidentally, the polyolefin resin used in the graft modification may be only the polyolefin resin A (i.e., the component (A)), only the polyolefin resin B (i.e., the component (B)), or a mixture of the polyolefin resin A and the polyolefin resin B, or a copolymer of the polyolefin resin A and the polyolefin resin B. The polyolefin resin used in the graft modification may be only the chlorinated polyolefin resin A, only the chlorinated polyolefin resin B, or a mixture of the chlorinated polyolefin resin A and the chlorinated polyolefin resin B, or a copolymer of the chlorinated polyolefin resin A and the chlorinated polyolefin resin B.

The radical generator may be selected, as appropriate, from among known radical generators, and is preferably an organic peroxide compound. Examples of the organic peroxide compound include di-t-butylperoxide, dicumylperoxide, t-butylcumylperoxide, benzoyl peroxide, dilauryl peroxide, cumene hydroperoxide, t-butyl hydroperoxide, 1,4-bis[(t-butyl peroxy)isopropyl]benzene, 1,1-bis(t-butyl peroxy)-3,5,5-trimethylcyclohexane, 1,1-bis(t-butyl peroxy)-cyclohexane, cyclohexanone peroxide, t-butyl peroxybenzoate, t-butyl peroxy isobutyrate, t-butyl peroxy-3,5,5-trimethylhexanoate, t-butyl peroxy-2-ethyl hexanoate, t-butyl peroxy isopropyl carbonate, and cumylperoxy octate. Among these, di-t-butylperoxide, dicumylperoxide, and dilauryl peroxide are preferable.

The radical generator may be used alone or a plurality of kinds in combination.

The addition amount of the radical generator in the graft modification reaction is preferably 1 to 100 mass %, and more preferably 10 to 50 mass % to the total (mass) of the addition amount of the component (C) and the other graft components. When it is 1 mass % or more, it is possible to maintain an adequate grafting efficiency. When it is 100 mass % or less, the reduction of the weight-average molecular weight of the chlorinated polyolefin resin composition can be prevented.

The graft mass of the component (C) in the chlorinated polyolefin resin composition is preferably 0.1 to 20 mass %, more preferably 0.5 to 10 mass %, and further preferably 1 to 5 mass % when the modified polyolefin resin is set to 100 mass %. When the graft mass is 0.1 mass % or more, it is possible to maintain the adhesion of the resulting chlorinated polyolefin resin composition to the metal adherend. When the graft mass is 20 mass % or less, it is possible to prevent the occurrence of graft unreacted substances, and to obtain adequate adhesion to the resin adherend.

The graft mass of the component (C) can be measured with a known method. The graft mass can be calculated by, for example, an alkali titration method or a Fourier transform infrared spectroscopy method.

The polyolefin resin composition of the present invention may be graft-modified with a graft component other than the component (C) according to use and object within a scope that does not impair the properties of the present invention. Examples of the other graft component include (meth) acrylate derivatives (e.g., a (meth)acrylate ester, an N-methyl(meth)acrylamide, hydroxyethyl(meth)acrylamide, and (meth)acryloyl morpholine).

Incidentally, the other graft component may be used alone or a plurality of kinds in combination.

[2. Manufacturing Method]

The chlorinated polyolefin resin composition of the present invention can be manufactured with, for example, the following method.

The component (A) and the component (B) are dissolved by heating in an organic solvent (e.g., toluene) that dissolves the components to the level of reaction, a polyolefin resin being a copolymer of the component (A) and the component (B) is obtained. The graft component such as the component (C) is added thereto, and the polyolefin resin is reacted with the graft component to obtain a modified polyolefin resin. The resultant is placed in a glass-lined reaction vessel, chloroform is added. Then, the resultant is heated for adequate dissolution under the prescribed pressure, and thereafter the azobisisobutyronitrile is added thereto. The chlorine gas is injected while controlling the vessel-internal pressure, chlorination is carried out until a suitable chlorine content is reached to obtain the chlorinated polyolefin resin composition of the present invention.

There is also a method in which a mixture obtained only by dissolving the component (A) and the component (B) in an organic solvent is modified in the manner described above, and then chlorination is carried out to obtain the chlorinated polyolefin resin composition of the present invention. Moreover, there is also a method in which the component (A) (or the component (B)) is modified alone in the manner described above and chlorination is carried to obtain a chlorinated polyolefin resin of the chlorinated component (A) (or component (B)), and then the chlorinated polyolefin resin is mixed with the component (B) (or the component (A)) (including a modified product and/or a chlorinated product thereof).

In addition, there is also a method in which the component (A), the component (B) and, as needed, a graft component such as the component (C) are dissolved beforehand by heating in an organic solvent that dissolves the components to the level of reaction, causing a reaction, and then chlorination is carried out. Furthermore, there is also a method in which the component (A), the component (B) and, as needed, a graft component such as the component (C), are melted and kneaded with a Banbury mixer, a kneader, an extruder, or the like, to react them, and then chlorination is carried out.

[3. Physical Properties]

The weight-average molecular weight of the chlorinated polyolefin resin composition of the present invention is preferably 10,000 to 200,000, and more preferably 20,000 to 120,000. When the weight-average molecular weight is 10,000 or more, an adequate adhesive force can be expressed. When the weight-average molecular weight to 200,000 or less, it is possible to obtain an adequate solvent solubility.

Incidentally, the weight-average molecular weight of the chlorinated polyolefin resin composition of the present invention, including the following Examples, is a value calculated after measurement with gel permeation chromatography (standard substance: polystyrene).

When being chlorinated, the adhesive force of the chlorinated polyolefin resin composition to a non-polar base material and the compatibility of the chlorinated polyolefin resin composition with many components in the solution are increased. Moreover, when being graft-modified with the compound (C) or the like, the adhesion is still improved.

When polyolefin resins having different melting points shown by the component (A) and the component (B) are contained as the resins being chlorinated (and modified), the crystallinity of the resins in the chlorinated polyolefin resin composition is not uniform state, and therefore a resin coating film having suitable elasticity can be formed. In addition, the compatibility with the other components is further improved, and the solution stability becomes excellent.

The chlorinated polyolefin resin composition of the present invention preferably further contains at least any one of component selected from the group consisting of solution, a curing agent, and an adhesion component as the other component.

One embodiment of the chlorinated polyolefin resin composition of the present invention contains the chlorinated polyolefin resin compound described above and solution. An example of the solution is organic solvent. Examples of the organic solvent include aromatics such as toluene and xylene; esters such as ethyl acetate and butyl acetate; ketones such as methyl ethyl ketone, methyl butyl ketone, and ethylcyclohexane; and aliphatic and alicyclic hydrocarbons such as cyclohexane, methylcyclohexane, nonane, and decane.

These organic solvents may be used alone or two or more mixed solvent may be contained in the resin composition. From a view of environmental issues, it is preferable to use the solvents other than aromatics as the organic solvent, and more preferable to use mixed solvents of alicyclic hydrocarbons and esters or ketones.

In addition, in order to enhance the storage stability of the solution of the resin composition containing the chlorinated polyolefin resin composition and the solution, alcohols (e.g., methanol, ethanol, propanol, isopropyl alcohol, or butanol) and propylene glycol ethers (e.g., propylene glycol methyl ether, propylene glycol ethyl ether, or propylene glycol-t-butyl ether) may be used alone or two or more kinds by mixture. In this case, 1 to 20 mass % is preferably added to the organic solvent.

The other embodiment of the chlorinated polyolefin resin composition of the present invention is a composition containing the chlorinated polyolefin resin composition described above and a curing agent. Examples of the curing agent include a polyisocyanate compound, an epoxy compound, a polyamine compound, a polyol compound, and a crosslinking agent in which the functional group thereof is blocked by a protecting group. The curing agent may be used alone or a plurality of kinds in combination.

The blending amount of the curing agent can be selected, as appropriate, according to the content amount of the component (C) in the chlorinated polyolefin resin composition of the present invention. In addition, when containing the curing agent, a catalyst such as an organic tin compound or a tertiary amine compound may be used in combination according to the object.

The still other embodiment of the chlorinated polyolefin resin composition of the present invention is a composition containing the chlorinated polyolefin resin composition described above and an adhesion component. Known adhesive components such as a polyester adhesive, a polyurethane adhesive, or an acrylic adhesive may be used as the adhesion component within a scope that does not inhibit the desired effect.

[4. Primer, Binder, and Adhesive]

The primer, the binder for coating, the binder for ink, and the adhesive of the present invention contain the chlorinated polyolefin resin composition described above. Therefore, they have excellent adhesion, solution stability, and thermal resistance, and can be suitably used as a primer when coating the top coat onto a polyolefin base material such as an automotive bumper, and as a binder for coating being superior in adhesion to a top coat coating or a clear.

The primer, the binder for coating, the binder for ink, and the adhesive of the present invention can be used in a form according to the application, such as solution, a powder, or a sheet. In addition, an additive such as an antioxidant, a photostabilizer, an ultraviolet ray absorber, a pigment, a dye, or an inorganic filler may be used according to need at the time of using.

EXAMPLES

The present invention is described below in detail with examples. The following examples are for appropriately describing, not limiting, the present invention. Incidentally, the methods for measuring and evaluating the physical property values and the like are described below, and "parts" refers to parts by mass unless otherwise specified.

[MFR (g/10 min)]: It was calculated with a Melt Flow Index Tester (manufactured by YASUDA SEIKI SEISAKUSHO) with a measurement load of 2.16 kg in accordance with ASTM D1238. When measuring the MFR of the component (A) or component (B), the measurement temperature was 230° C.

[Tm(° C.)]: In accordance with JIS K7121-1987, a DSC measuring device (manufactured by Seiko Instruments & Electronics) was used to hold a sample of approximately 5 mg at 200° C. for 10 minutes in a heated molten state, and then lower the temperature at a rate of 10° C./min for stable holding at −50° C. Then the temperature was raised again up to 200° C. at a rate of 10° C./min, the melting peak temperature at the time of melting was measured, and that temperature was used as the Tm.

[Weight-average molecular weight]: Measurement was made under the conditions below using a GPC (manufactured by Tosoh Corporation).
Columns: TSK-gel G-6000 HXL, G-5000 HL, G-4000 HXL, G-3000 HXL, and G-2000 HXL (manufactured by Tosoh Corporation)
Eluent: THF
Flow rate: 1.0 mL/min
Pump oven and column oven temperature: 40° C.
Injection quantity: 100 μL
Molecular weight standard: polystyrene ("Easical PS-1", supplied by Agilent Technology)

[Graft mass of component (C))(mass %)]: It was measured by an alkali titration method.

[Chlorine content (mass %)]: It was measured on the basis of JIS-K7229.

[Solution nature]: The chlorinated polyolefin resin composition obtained in the examples and the comparative examples was mixed with toluene to obtain resin solution with a solid content of 20 mass %. 15 parts of the prepared resin solution were added to 90 parts of toluene solution of a urethane resin for primer coating, in which a solid content thereof was 30 mass %, and the resultant was stirred in a shaker for 10 minutes. After the resultant was allowed to stand for one day at room temperature, the solution nature was observed, and the compatibility was visually evaluated from the separation state of the solution. The evaluation criteria are noted below. Practical application can be made without problem when there is an evaluation of at least a "C".

(Criteria for Evaluating the Solution Nature)
A: With no increase in viscosity or separation seen in the solution, the solution nature is good.
B: A slight increase in viscosity or turbidity is confirmed in the solution, but there is no separation or the like.
C: There is no component separation but fine particles were confirmed in the solution.
D: Component separation was visually confirmed.

[Production of the coated plate]: The chlorinated polyolefin resin composition obtained in the examples and the comparative examples was mixed with mixed solvent of toluene/cyclohexane having a ratio 9/1 to obtain resin solution with a solid content of 20 mass %. The resultant was sprayed onto a polypropylene base material and a dull steel plate so that the dried coating film was 10 to 15 μm thickness, and this was allowed to stand for 10 minutes at room temperature to produce a primer layer.

Next, a urethane coating was applied so that the dried coating film was 20 to 25 μm thickness onto the primer layer surface, and this was allowed to stand for 10 minutes at room temperature to produce a base layer. Next a solvent clear coating was applied so that the dried coating film was 25 to 30 μm thickness onto the base layer surface, and this was allowed to stand for 10 minutes at room temperature, and the resultant was subjected to heat treatment for 15 minutes at 80° C.

Thus obtained polypropylene coated plate was used in an adhesion test, and thus obtained dull steel coated plate was used in a chipping resistance test and a gasohol resistance test.

[Adhesion test]: Linear marks reaching to the base were made vertically and horizontally at 1 mm intervals on the coating film surface of the polypropylene coated plate to prepare 100 divisions (squares). The cellophane adhesive tape was adhered thereon and then peeled off at a 180° direction. The operation for adhering and peeling off the cellophane adhesive tape was repeated 10 times in each of the 100 divisions, and the adhesion (adhesiveness) was evaluated using the criteria below. Practical application can be made without problem when there is an evaluation of at least a "C".

(Criteria for Evaluating Adhesion)
A: The coating film does not separate.
B: The numbers of the division where the coating film is separated are 1 to 10.
C: The numbers of the division where the coating film is separated are more than 10 to 50.

D: The numbers of the division where the coating film is separated are more than 50.

[Chipping resistance test]: The dull steel coated plate was cooled in a cold room cooled to −20° C., and the test plate was fixed at the test sheet attachment part of a chipping test machine (manufactured by Suga Test Instruments, model JA-400) so as to form a 90° angle from the horizontal. To the fixed test plate, 100 g of number 7 crushed stone were sprayed for 5 seconds with an air pressure of 5 kgf/cm² to damage the test plate. Then the dull steel coated plate was washed with water and dried. The cellophane adhesive tape was adhered to the coating surface, the tape was peeled off with one end held. The coating film that had risen due to chipping was removed, and the degree of peeling damage was evaluated using the criteria below. The evaluation of the peeling damage was carried out within a frame that was 70 mm vertical×70 mm horizontal in the impacted area.
(Criteria for Evaluating Chipping Resistance)
A: The most favorable. The peeling area ratio per evaluation area is 0.0% or more and less than 0.7%.
B: Favorable. The peeling area ratio per evaluation area is 0.7% or more and less than 1.2%.
C: Poor. The peeling area ratio per evaluation area is 1.2% or more and less than 3.5%.
D: Worst. The peeling area ratio per evaluation area is 3.5% or more.

[Gasohol Resistance Test]: The Dull Steel Coated plate was immersed in regular gasoline/ethanol having a ratio of 9/1 (v/v) for 120 minutes, the coating film state was observed, and the gasohol resistance was evaluated with the criteria below. Practical application can be made without problem if there is no separation in the coating film surface.
(Criteria for Evaluating Gasohol Resistance)
A: There is no change in the coating film surface.
B: A slight change is seen in the coating film surface but no separation is seen.
C: Change is seen in the coating film surface but there is no separation.
D: There is separation in the coating film surface.

Example 1

35 parts of an ethylene-propylene random copolymer A-1 (97 mass % of the propylene component, 3 mass % of the ethylene component, MFR=2.0 g/10 min, $Tm_A$=125° C.) as the component (A), 65 parts of an ethylene-propylene block copolymer B-1 (85 mass % of the propylene component, 15 mass % of the ethylene component, MFR=20.0 g/10 min, $Tm_B$=103° C.) as the component (B), 4 parts of maleic anhydride, and 2 parts of di-t-butyl peroxide were mixed uniformly and supplied to a twin-screw extruder (L/D=60, dia.=15 mm, first to 14th barrels).

The reaction was carried out with a retention time of 10 min, a rotation speed of 200 rpm, and barrel temperatures of 100° C. (first and second barrels), 200° C. (third to eighth barrels), 90° C. (ninth and 10th barrels), and 110° C. (11th to 14th barrels), and decompression treatment was carried out to remove the unreacted maleic anhydride to obtain a maleic anhydride modified polypropylene resin.

100 parts of the resulting maleic anhydride modified polypropylene resin were placed in a glass-lined reaction vessel. After Chloroform was added and the resultant was adequately dissolved at a temperature of 110° C. under a pressure of 2 kg/cm², 2 parts of azobisisobutyronitrile were added, and then chlorine gas was injected therein while controlling the vessel-internal pressure to 2 kg/cm² to carry out chlorination.

After the reaction was completed, 6 parts of an epoxy compound (Epocizer W-100-EL, manufactured by Dainippon Printing Ink Manufacturing) were added as a stabilizer. The resultant was supplied to a vented extruder provided with a desolventizing suction section at the screw shaft, and the desolventizing and the solidification were carried out to obtain a chlorinated polyolefin resin composition 1 (graft mass of the maleic anhydride=3 mass %, chlorine content=23 mass %) being a chlorinated polyolefin resin and having a weight-average molecular weight of 78,000.

Example 2

Into a four-neck flask equipped with a stirrer, a cooling tube, and a dropping funnel, 20 parts of an ethylene-propylene random copolymer A-2 (99 mass % of the propylene component, 1 mass % of the ethylene component, MFR=1.5 g/10 min, $Tm_A$=140° C.) as the component (A) and 80 parts of an ethylene-propylene block copolymer B-2 (90 mass % of the propylene component, 10 mass % of the ethylene component, MFR=15 g/10 min, $Tm_B$=118° C.) as the component (B) were placed, and the polymers were completely dissolved with a 180° C. oil bath. After approximately 10 minutes of nitrogen substitution in the flask, 4 parts of maleic anhydride were added over an approximately five minute period while stirring, and 0.4 parts of di-tert-butyl peroxide dissolved in 1 part of heptane were added from a dropping funnel over an approximately 30 minute period.

Then the internal temperature in the system was held at 180° C., the reaction was further continued for one hour, and the unreacted maleic anhydride was removed over approximately one hour while reducing the pressure in the flask with an aspirator to obtain a maleic anhydride modified polypropylene resin.

100 parts of the resulting maleic anhydride modified polypropylene resin were placed in a glass-lined reaction vessel. Chloroform was added, and chlorine gas was injected therein while irradiating ultraviolet rays under a pressure of 2 kg/cm² to carry out chlorination.

After the reaction was completed, 6 parts of an epoxy compound (Epocizer W-100-EL, manufactured by Dainippon Printing Ink Manufacturing) were added as a stabilizer. The resultant was supplied to a vented extruder provided with a desolventizing suction section at the screw shaft, and the desolventizing and the solidification were carried out to obtain a chlorinated polyolefin resin composition 2 (graft mass of the maleic anhydride=5 mass %, chlorine content=15 mass %) being a chlorinated polyolefin resin and having a weight-average molecular weight of 60,000.

Example 3

A chlorinated polyolefin resin composition 3 (graft mass of the maleic anhydride=1 mass %, chlorine content=24 mass %) having a weight-average molecular weight of 120,000 was obtained in the same manner as in Example 1 except for using 80 parts of an ethylene-propylene-butene random copolymer A-3 (85 mass % of the propylene component, 10 mass % of the ethylene component, 5 mass % of the butene component, MFR=3.7 g/10 min, $Tm_A$=102° C.) as the component (A) and 20 parts of the ethylene-propylene block copolymer B-2 (90 mass % of the propylene component, 10 mass % of the ethylene component, MFR=15 g/10 min, $Tm_B$=118° C.) as the component (B).

Example 4

A chlorinated polyolefin resin composition 4 (graft mass of the maleic anhydride=3 mass %, chlorine content=30 mass %) having a weight-average molecular weight of 20,000 was obtained in the same manner as in Example 1 except for using 35 parts of the ethylene-propylene-butene random copolymer A-3 (85 mass % of the propylene component, 10 mass % of the ethylene component, 5 mass % of the butene component, MFR=3.7 g/10 min, $Tm_A$=102° C.) as the component (A) and 65 parts of an ethylene-propylene random copolymer B-3 (89 mass % of the propylene component, 11 mass % of the ethylene component, MFR=7 g/10 min, $Tm_B$=58° C.) as the component (B).

Example 5

Into a four-neck flask equipped with a stirrer, a cooling tube, and a dropping funnel, 80 parts of the ethylene-propylene random copolymer A-2 (99 mass % of the propylene component, 1 mass % of the ethylene component, MFR=1.5 g/10 min, $Tm_A$=140° C.) as the component (A) and 20 parts of the ethylene-propylene random copolymer B-3 (89 mass % of the propylene component, 11 mass % of the ethylene component, MFR=7 g/10 min, $Tm_B$=58° C.) as the component (B) were placed, and then added into a glass-lined reaction vessel.

Chloroform was added, and the resultant was adequately dissolved at a temperature of 110° C. under a pressure of 2 kg/cm². Thereafter, 2 parts of azobisisobutyronitrile were added, and chlorine gas was injected therein while controlling the vessel-internal pressure to 2 kg/cm² to carry out chlorination.

After the reaction was completed, 6 parts of an epoxy compound (Epocizer W-100-EL, manufactured by Dainippon Printing Ink Manufacturing) were added as a stabilizer. The resultant was supplied to a vented extruder provided with a desolventizing suction section at the screw shaft, and the desolventizing and the solidification were carried out to obtain a chlorinated polyolefin resin composition 5 (chlorine content=25 mass %) having a weight-average molecular weight of 100,000.

Comparative Example 1

A chlorinated polyolefin resin composition 6 (graft mass of the maleic anhydride=3 mass %, chlorine content=23 mass %) having a weight-average molecular weight of 80,000 was obtained in the same manner as in Example 1 except for using 35 parts of the ethylene-propylene random copolymer A-1 (97 mass % of the propylene component, 3 mass % of the ethylene component, MFR=2.0 g/10 min, $Tm_A$=125° C.) as the component (A) and 65 parts of an ethylene-propylene block copolymer B-4 (85 mass % of the propylene component, 15 mass % of the ethylene component, MFR=20 g/10 min, $Tm_B$=165° C.) as the component (B).

Comparative Example 2

A chlorinated polyolefin resin composition 7 (graft mass of the maleic anhydride=10 mass %, chlorine content=20 mass %) having a weight-average molecular weight of 70,000 was obtained in the same manner as in Example 1 except for using 65 parts of the ethylene-propylene-butene random copolymer A-4 (80 mass % of the propylene component, 5 mass % of the ethylene component, 15 mass % of the butene component, MFR=2.8 g/10 min, $Tm_A$=81° C.) as the component (A) and 35 parts of the ethylene-propylene block copolymer B-1 (85 mass % of the propylene component, 15 mass % of the ethylene component, MFR=20 g/10 min, $Tm_B$=103° C.) as the component (B).

Comparative Example 3

A chlorinated polyolefin resin composition 8 (graft mass of the maleic anhydride=20 mass %, chlorine content=18 mass %) having a weight-average molecular weight of 90000 was obtained in the same manner as in Example 1 except for using 35 parts of the ethylene-propylene random copolymer A-1 (97 mass % of the propylene component, 3 mass % of the ethylene component, MFR=2.0 g/10 min, $Tm_A$=125° C.) as the component (A) and 65 parts of an ethylene-propylene-butene random copolymer B-5 (65 mass % of the propylene component, 11 mass % of the ethylene component, 24 mass % of the butene component, MFR=10 g/10 min, $Tm_D$=48° C.) as the component (B).

The type, the composition, and the physical property values of the component (A) and the component (B) used in the examples 1 to 5 and comparative examples 1 to 3, and the composition and the physical property values of the resulting chlorinated polyolefin resin compositions 1 to 8 are summarized in Table 1.

TABLE 1

|  | Component (A) | | | | Component (B) | | | |
| --- | --- | --- | --- | --- | --- | --- | --- | --- |
|  | Copolymer | P/E/B ratio | Tm (° C.) | MFR (g/10 min) | Copolymer | P/E/B ratio | Tm (° C.) | MFR (g/10 min) |
| Ex. 1 | Random copolymer A-1 | 97/3/0 | 125 | 2.0 | Block copolymer B-1 | 85/15/0 | 103 | 20 |
| Ex. 2 | Random copolymer A-2 | 99/1/0 | 140 | 1.5 | Block copolymer B-2 | 90/10/0 | 118 | 15 |
| Ex. 3 | Random copolymer A-3 | 85/10/5 | 102 | 3.7 | Block copolymer B-2 | 90/10/0 | 118 | 15 |
| Ex. 4 | Random copolymer A-3 | 85/10/5 | 102 | 3.7 | Random copolymer B-3 | 89/11/0 | 58 | 7 |
| Ex. 5 | Random copolymer A-2 | 99/1/0 | 140 | 1.5 | Random copolymer B-3 | 89/11/0 | 58 | 7 |
| Comp. Ex. 1 | Random copolymer A-1 | 97/3/0 | 125 | 2.0 | Block copolymer B-4 | 85/15/0 | 165 | 20 |
| Comp. Ex. 2 | Random copolymer A-4 | 80/5/15 | 81 | 2.8 | Block copolymer B-1 | 85/15/0 | 103 | 20 |
| Comp. Ex. 3 | Random copolymer A-1 | 97/3/0 | 125 | 2.0 | Random copolymer B-5 | 65/11/24 | 48 | 10 |

TABLE 1-continued

|  | Component (C) graft mass (mass%) | $|Tm_A - Tm_B|$ | Component (A)/ component (B) | Chlorine content (%) | Weight-average molecular weight (Mw) |
|---|---|---|---|---|---|
| Ex. 1 | 3 | 22 | 35/65 | 23 | 78,000 |
| Ex. 2 | 5 | 22 | 20/80 | 15 | 60,000 |
| Ex. 3 | 1 | 16 | 80/20 | 24 | 120,000 |
| Ex. 4 | 3 | 44 | 35/65 | 30 | 20,000 |
| Ex. 5 | 0 | 82 | 80/20 | 25 | 100,000 |
| Comp. Ex. 1 | 3 | 40 | 35/65 | 23 | 80,000 |
| Comp. Ex. 2 | 10 | 22 | 65/35 | 20 | 70,000 |
| Comp. Ex. 3 | 20 | 77 | 35/65 | 18 | 90,000 |

The resulting chlorinated polyolefin resin compositions 1 to 8 were used to evaluate the solution stability, the chipping resistance, the adhesion, and the gasohol resistance. The results are summarized in Table 2.

TABLE 2

|  | solution stability | chipping resistance | adhesion | gasohol resistance |
|---|---|---|---|---|
| Ex. 1 | B | A | A | B |
| Ex. 2 | A | A | B | B |
| Ex. 3 | B | A | B | A |
| Ex. 4 | A | B | B | A |
| Ex. 5 | B | B | B | B |
| Comp. Ex. 1 | D | D | C | C |
| Comp. Ex. 2 | C | D | C | D |
| Comp. Ex. 3 | C | D | D | C |

As shown in Table 2, the chlorinated polyolefin resin composition of the present invention was evaluated as "A" or "B" for solution stability, chipping resistance, adhesion, and gasohol resistance, and therefore it is superior in adhesion, solution stability, and chipping resistance. On the other hand, the conventional chlorinated polyolefin resin compositions were evaluated as "D" for at least any one of solution stability, chipping resistance, adhesion, and gasohol resistance, and therefore it is desired for practically improvements.

The invention claimed is:

1. A chlorinated polyolefin resin composition, comprising:
a component (A): a polyolefin resin A having a melting point ($Tm_A$) obtained with a differential scanning calorimeter (DSC) of 90 to 160° C., and
a component (B): a polyolefin resin B having a melting point ($Tm_B$) obtained with a differential scanning calorimeter (DSC) of 50 to 130° C.,
wherein at least one of the component (A) and the component (B), or a copolymer of the component (A) and the component (B) is a chlorinated polyolefin resin, where $|Tm_A-Tm_B|\geq 5°$ C.;
wherein the component (B) is a propylene block copolymer comprising a propylene component and another α-olefin component, and the propylene copolymer comprises 60 mass % or more of propylene-derived constituent units; and
wherein the component (A) is a copolymer, and the component (A) comprises 60 mass % or more of propylene-derived constituent units.

2. The chlorinated polyolefin resin composition according to claim 1,
wherein at least one of the component (A) and the component (B), or the copolymer thereof is a graft-modified product of an α,β-unsaturated carboxylic acid or an anhydride thereof.

3. The chlorinated polyolefin resin composition according to claim 1,
wherein a content ratio of the component (A) and the component (B), represented by component (A)/component (B) is of 90/10 to 10/90, where component (A)+ component (B)=100.

4. The chlorinated polyolefin resin composition according to claim 1,
wherein the copolymer of the component (A) and the component (B) is a chlorinated polyolefin resin.

5. The chlorinated polyolefin resin composition according to claim 1, which has a chlorine content of 10 to 40 mass %.

6. The chlorinated polyolefin resin composition according to claim 1, which has a weight-average molecular weight of 10,000 to 200,000.

7. A primer comprising the chlorinated polyolefin resin composition according to claim 1.

8. An adhesive comprising the chlorinated polyolefin resin composition according to claim 1.

9. A binder for coating comprising the chlorinated polyolefin resin composition according to claim 1.

10. A binder for ink comprising the chlorinated polyolefin resin composition according to claim 1.

11. The chlorinated polyolefin resin composition according to claim 1, wherein a melt flow rate of the component (A) is 0.5-5 g/10 min, wherein the melt flow rate is measured with a measuring load of 2.16 kg and at a temperature of 230° C.

12. The chlorinated polyolefin resin composition according to claim 1, wherein a melt flow rate of the component (B) is 5-40 g/10 min, wherein the melt flow rate is measured with a measuring load of 2.16 kg and at a temperature of 230° C.

13. The chlorinated polyolefin resin composition according to claim 1, wherein the component (A) is a copolymer, and the component (A) comprises 60-99 mass % of propylene-derived constituent units.

14. The chlorinated polyolefin resin composition according to claim 1, wherein the component (A) is a copolymer, and the copolymer comprises up to 5 mass % of butene-derived constituent units.

15. The chlorinated polyolefin resin composition according to claim 1, wherein the component (B) is a block copolymer consisting of propylene and ethylene.

16. The chlorinated polyolefin resin composition according to claim 1, wherein the polyolefin resin A has a melting point ($Tm_A$) obtained with a DSC of 100 to 140° C.

17. The chlorinated polyolefin resin composition according to claim 1, wherein the polyolefin resin B has a melting point ($Tm_B$) obtained with a DSC of 55 to 120° C.

* * * * *